(12) United States Patent
Bacos et al.

(10) Patent No.: US 6,695,960 B1
(45) Date of Patent: Feb. 24, 2004

(54) METHOD FOR PRODUCING A METAL ALLOY POWDER SUCH AS MCRALY AND COATINGS OBTAINED WITH SAME

(75) Inventors: Marie Pierre Bacos, Antony (FR); Pierre Josso, Issy-les-Moulineaux (FR)

(73) Assignee: Onera (Office National d' Etudes et de Recherchers Aerospatiales), Chatillon (FR)

( * ) Notice: Subject to any disclaimer, the term of this patent is extended or adjusted under 35 U.S.C. 154(b) by 0 days.

(21) Appl. No.: 09/868,267

(22) PCT Filed: Dec. 15, 1999

(86) PCT No.: PCT/FR99/03154

§ 371 (c)(1), (2), (4) Date: Jun. 14, 2001

(87) PCT Pub. No.: WO00/36181

PCT Pub. Date: Jun. 22, 2000

(51) Int. Cl.[7] .............................. C23C 18/54; C25D 5/04
(52) U.S. Cl. ..................... 205/74; 205/176; 205/178; 205/184; 205/224; 427/212; 427/585
(58) Field of Search ................... 205/74, 176, 178, 205/184, 224; 427/212, 585

(56) References Cited

U.S. PATENT DOCUMENTS

| 3,918,139 A | 11/1975 | Felten | 29/194 |
|---|---|---|---|
| 4,305,792 A | 12/1981 | Kedward et al. | 204/16 |
| 4,486,233 A | 12/1984 | Josso et al. | 106/1.22 |
| 4,810,334 A | 3/1989 | Honey et al. | 204/16 |
| 4,844,739 A | 7/1989 | Josso et al. | 106/1.27 |
| 5,037,513 A | 8/1991 | Foster | 204/16 |
| 5,085,693 A | 2/1992 | Josso et al. | 106/1.28 |
| 5,698,273 A | 12/1997 | Azad et al. | 427/566 |
| 5,776,620 A | 7/1998 | Josso et al. | 428/610 |
| 6,183,888 B1 * | 2/2001 | Alperine et al. | 428/670 |

FOREIGN PATENT DOCUMENTS

| FR | 2 531 103 | 2/1984 |
|---|---|---|
| FR | 2 590 595 | 5/1987 |
| FR | 2 652 822 | 4/1991 |
| FR | 2 652 823 | 4/1991 |
| FR | 2 720 392 | 12/1995 |

OTHER PUBLICATIONS

Steinmetz, et al., "Electroless Deposition of Pure Nickel, Palladium and Platinum", Office National D'Etudes et de Recherches Aerospatiales, Apr. 1990, pp 1–19.

* cited by examiner

*Primary Examiner*—Arun S. Phasge
(74) *Attorney, Agent, or Firm*—Christie, Parker & Hale, LLP

(57) ABSTRACT

The invention concerns a method comprising a step which consists in producing, on a precursor alloy powder containing at least the elements Cr, Al and Y, using a chemical or electrolytic deposition bath, a deposition containing at least a modifying element such as platinum, palladium, ruthenium or rhenium. The modifying element enhances the capacity of the coating to form from phase β, by exposure to oxygen at high temperature, an adhesive alumina surface barrier. The invention is useful for protecting against corrosion and oxidation at high temperatures aviation turbine blades.

24 Claims, 1 Drawing Sheet

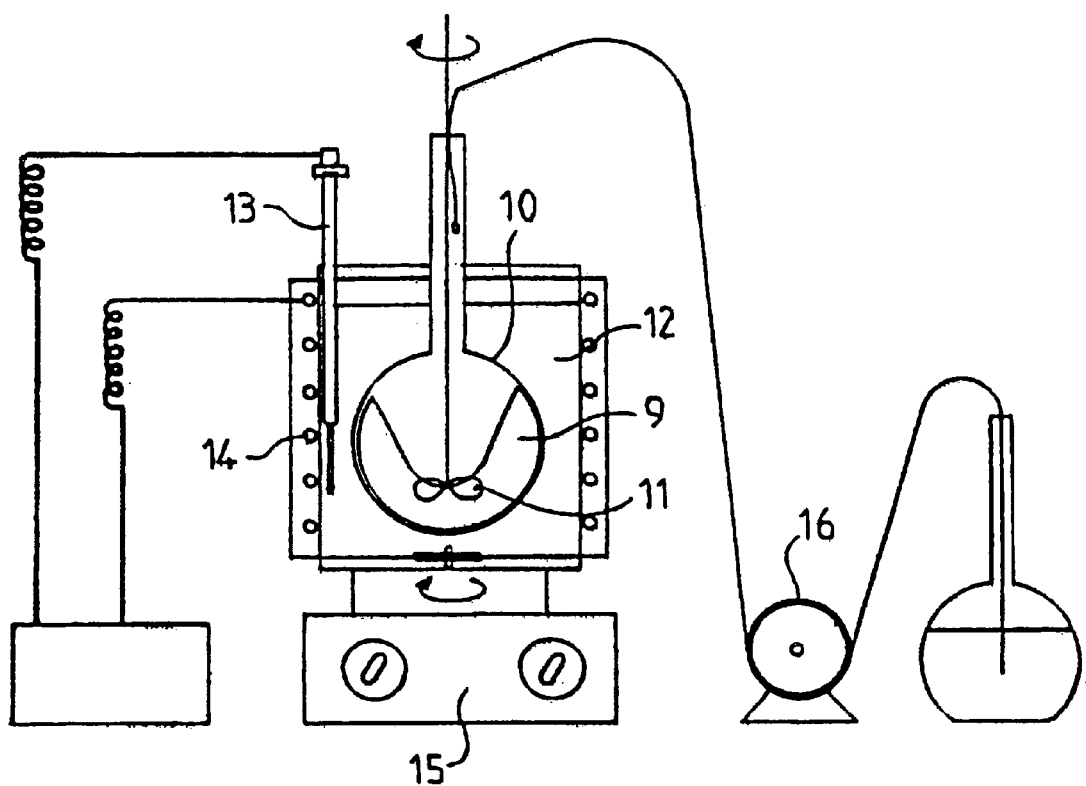

METHOD FOR PRODUCING A METAL ALLOY POWDER SUCH AS MCRALY AND COATINGS OBTAINED WITH SAME

CROSS-REFERENCE TO RELATED APPLICATION

This application claims priority of International application number PCT/FR99/03154, filed Dec. 15, 1999, which in turn claims priority to French patent application number 98/15889, filed Dec. 16,1998.

The present invention relates to a process for producing a metal alloy powder containing nickel and/or cobalt, chromium, aluminium and yttrium in the form of a γ phase and a β phase dispersed in the γ phase, capable of forming from the β phase, by exposure to air at elevated temperatures, an adhering superficial alumina barrier.

It is known to protect metal parts operating at high temperatures, in particular aeronautical turbine blades, against corrosion and/or oxidation by applying various coatings obtained by diffusion (mainly based on nickel aluminide β-NiAl, if necessary modified by additional elements). These coatings have numerous advantages but are restricted as regards composition. For certain applications the "ideal" coating may have a chemical composition that is impossible to obtain by diffusion. This is why the projection application of alloys such as those described by the qualitative formula MCrAlY (where M=Ni and/or Co and/or Fe) has been studied by means of physical deposition techniques. These techniques enable so-called "active" elements such as yttrium, hafnium, tantalum and zirconium to be added in trace amounts (up to 2%) to the deposited coating.

A typical example of an MCrAlY coating consists of a nickel-based alloy containing 20% of cobalt powder, enabling the following reaction to be avoided:

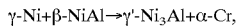

$$\gamma\text{-Ni}+\beta\text{-NiAl}\rightarrow\gamma'\text{-Ni}_3\text{Al}+\alpha\text{-Cr},$$

which is possible above 1,000° C., 20 to 25% of chromium in order to reinforce the resistance to type I corrosion, 6 to 8% of aluminium (aluminoforming compound) and about 0.5% of yttrium, which reinforces the adherence of the alumina layer to the aluminoforming alloy. Its general microstructure is that of a two-phase alloy containing precipitated β-NiAL (aluminoforming phase) in a γ matrix. According to the conditions of use, other elements may be added and/or the above concentrations may be altered. For example, if the coating is intended to be used to prevent type II hot corrosion in the presence of vanadium, the concentration of chromium may exceed 30% by weight. Numerous MCrAlY compositions are commercially available, the most commonly used being those known under the names AMDRY 997 (NiCoCrAlYTa) and AMDRY 995 (CoNiCrAlYTa).

A particularly interesting feature of these protective alloys is the possibility of adding active elements thereto. The addition, in small amounts (of the order of 1 atomic % or less), of elements such as Y at Hf improves very significantly the adhesion of $Cr_2O_3$ or $Al_2O_3$ layers to the alloys in question. Due to this, the protective effect of the oxide layer is preserved over prolonged periods, particularly under thermal cycling conditions.

Among the physical deposition techniques noted above for obtaining MCrAlY coatings, there may be mentioned in particular hot projection and more especially plasma projection, in which the material to be deposited is introduced, by means of a carrier gas, into the jet of a plasma torch in the form of powder granules 20 to 100 μm in diameter. After having melted, the droplets of the material that has liquefied are projected at high speed onto the surface of the substrate. The plasma flame is produced by the very rapid expansion in a nozzle anode of a plasma-forming gas (Ar+10% $H_2$ for example) ionised during its passage through an arc chamber. Any material available in powder form that can be melted without decomposing or evaporating can thus be deposited on the surface of a substrate. This projection deposition may take place either at atmospheric pressure (in air or in a neutral atmosphere) or under reduced pressure. In all cases the coating is formed at a high rate, typically at a rate of 100 μm/minute. This deposition technique is extremely directional and is thus difficult to employ with parts that are of complex shape.

It is mainly plasma projection under reduced pressure that is used for the deposition of MCrAlY type alloys. The projection device is installed in an enclosure which is subjected to a high reduced pressure (P=0.05 bar). This enables oxidation of the projected alloy particles to be avoided, increases the velocity of the gases in the plasma jet and elongates the flame, which in turn increases the impact velocity of the molten particles and, consequently, reduces the porosity. Finally, it should be noted that this technique permits an initial ionic pickling to be carried out by polarising the surface of the substrate, which improves the adhesion of the coating to the substrate. The deposits obtained are adherent and slightly brittle and may be very thick (several millimetres thick). After projection of the particles, the MCrAlY coatings are diffused during a thermal treatment in vacuo. They are however rough and require a post-operative machining followed by a tribo-finishing.

There may also be mentioned a high velocity flame projection technique carried out by reacting a fuel (hydrocarbon and/or hydrogen) and a combustion-supporting medium (air reconstituted from a mixture of nitrogen and oxygen, or pure oxygen).

Another category of physical deposition techniques is that of vapour phase physical deposition, which involves triode cathodic sputtering and evaporation in an electron beam.

For the triode cathodic sputtering a three-electrode system polarised to a value of several kilovolts and placed in an enclosure subjected to a vacuum of about $10^{-2}$ Pa enables extremely adherent MCrAlY alloys that are non-porous and less directional than in the case of plasma projection to be deposited at a rate between 5 and 25 μm/hour.

In order to effect evaporation in an electron beam in an enclosure maintained under a vacuum harder than $10^{-4}$ Pa, an electron beam is focussed on the surface of the material to be deposited contained in a cooled metal crucible. A continuous ingot feed system enables the level of the liquid bath and the deposition conditions to be maintained constant. The emitted vapours condense on the substrate arranged opposite the liquid bath. This substrate is maintained at a sufficiently high temperature so as to minimise the inherent defects in the columnar growth of the deposit. These defects are subsequently eliminated by shock blasting followed by a thermal diffusion treatment and elimination of stresses. The deposition rates may reach values of up to 25 μm/min. This technique is described in U.S. Pat. No. 5,698,273 A, and was mainly developed for the deposition of MCrAlY on turbine machinery blades. Its widespread use is however limited on account of the associated investment and operating costs. Furthermore, this process is extremely directional and does not enable certain coating compositions to be easily obtained (e.g. in the case of alloys containing elements with widely differing vapour pressures).

On the other hand this process enables a combined protective +thermal barrier coating to be produced (zirconium oxide partially stabilised with yttrium oxide ($ZrO_2$+8% $Y_2O_3$)), this combined coating having better mechanical properties and a better resistance to thermal shock than coatings obtained by plasma projection.

Electrolytic deposition of the alloy MCrAlY(Ta) is impossible since it would involve the combined deposition in aqueous medium (water is no longer stable beyond −1 V with respect to a normal hydrogen electrode) of nickel (EO=−0.44 V), cobalt (EO =−0.28 V), chromium (EO=−0.744 V), aluminium (EO=−1.662 V), yttrium (EO=−2.372 V) and, possibly, tantalum (EO=−0.750 V). In order to obtain an MCrAlY deposit electrochemically it would thus be necessary to produce a composite deposit comprising on the one hand nickel and/or cobalt, and on the other hand particles of CrAlY, and then to effect the diffusion of the composite consisting of electrolytic deposit+particles+substrate at high temperature (typically 2 hours at 1100° C.). Examples of implementation of the above are described in U.S. Pat. Nos. 4,305, 792 A, 4,810, 334 A and 5,037,513 A.

In the absence of an electrolytic deposit, it is possible to cause particles to migrate in a strong electric field (typically 100 V). The chosen deposition medium should have a high dielectric constant and exhibit a high electrochemical stability. Electrophoresis satisfies these criteria. This technique is currently used for painting car bodies and enables metallic or non-metallic particles to be deposited. However, the resultant deposit is porous, friable and not particularly adherent, and has to be reinforced by a second deposit involving a conventional technique.

If the MCrAlY coating is exposed to an oxidising environment, its β phase oxidises (and consequently becomes depleted in aluminium) to form a stable and impermeable layer of alumina. The amount of β phase available decreases as this aluminium is consumed, and disappears completely over the course of several hundred hours. From then on the protection of the coating is ensured by the impermeability of the resultant alumina coating with respect to oxygen and by its anchorage in the protective coating. If however this ceramic layer were to disappear accidentally, the coating would no longer be able to re-form it.

In the case of coatings obtained by composite electrolytic deposition, it should be noted that the matrix has a limited composition, namely nickel, cobalt or nickel-cobalt. The additives should then be introduced into the co-deposited powder. This operation requires the preparation of a new alloy and sputtering of the latter, which involves a long series of complicated and expensive operations. The consolidation of the electrophoretic deposits is effected by means of a high temperature vapour phase deposition or by fusion of one of the deposited powders. On account of this fact the flexibility of the composition of the coating will depend on the amount of aluminium permitted in the MCrAlY alloy (β-γ equilibrium) or on the composition of the brazing powder that is used.

In the case of deposits formed by plasma or flame projection, this composition basically depends on the composition of the powder that is used. The changes in composition then necessitate the investigation and production of a new batch of powder, an operation which, as is known, is long and complicated.

Finally, in the case where the coating has to support a thermal barrier, the known processes are unable to promote the adherence of this barrier to the oxide layer ($Al_2O_3$) formed on the surface of the MCrAlY.

The object of the invention is to alleviate all or some of the aforementioned disadvantages.

The invention provides in particular a process of the type defined in the introduction, and comprises a stage involving the formation, on a powder of a precursor alloy containing at least one of the elements Cr, Al and Y and using a chemical or electrolytic deposition bath, of a deposit containing at least one modifying element capable of extending the existence domain of the said β phase and/or of increasing the fineness of its dispersion.

The powder that is thus obtained may be used in particular, as will be seen in more detail hereinafter, to form a protective coating of the MCrAlY type. The extension of the existence domain of the β phase due to the modifying element enables the said phase to subsist after a high consumption of aluminium and consequently to regenerate if necessary the alumina layer. A finer dispersion of this same phase improves the anchorage of the alumina layer in the MCrAlY coating.

Optional, complementary or alternative features of the invention are listed hereinafter:

The modifying element is selected from platinum, palladium, ruthenium, rhodium, osmium, iridium, iron, manganese and rhenium.

The said bath is an autocatalytic chemical bath containing oxalate ions, ions of the modifying element, and a complexing agent for the latter.

The modifying element is chosen from platinum and palladium, the said complexing agent is ethylenediamine, and the bath is strongly basic and contains in addition at least one stabiliser, hydrazine being added progressively as reducing agent.

The said bath is an aqueous autocatalytic chemical bath of pH between 8.5 and 14, whose dissolved species have the following initial composition in moles/litre:

| | |
|---|---|
| palladium ions | 0.01 to 0.3 |
| chloride ions | 0.01 to 0.5 |
| ethylenediamine | 1 to 4 |
| arsenic pentoxide | $10^{-4}$ to $10^{-2}$ |
| or copper sulfate | $10^{-5}$ to $10^{-3}$ |
| or potassium iodate | $10^{-6}$ to $10^{-3}$ |
| imidazole | 0.2 to 0.6, | the amount of ethylenediamine being sufficient to complex all the palladium ions and to combine moreover with chloride ions, thereby preventing the presence of free chloride ions in the vicinity of the particles to be coated.

The modifying element is deposited, at least in part, in the form of particles of this element or of a compound of the latter suspended in a deposition solution, the said particles being included in a matrix deposited from ions contained in the solution.

The said compound is a silicide.

The deposition solution contains nickel and/or cobalt ions, a compound of a flux element selected from boron and phosphorus and that is introduced progressively as reducing agent, and the matrix contains nickel and/or cobalt combined with the flux element.

The deposition solution contains furthermore at least one complexing agent for the said nickel and/or cobalt ions, and at least one water-soluble organic stabiliser that does not contain either sulfur or any metal or metalloid of Groups IIIa (except boron and aluminium), IVa (except carbon), Va (except nitrogen and phosphorus), VIa (except oxygen) and VIIa (except fluorine and chlorine), and that contains an electron pair that can easily be captured by nickel and/or cobalt.

The deposition stage of the modifying element is preceded or followed by a complementary stage consisting of the deposition of nickel and/or cobalt on a powder containing at least the elements Cr, Al and Y, from an autocatalytic deposition bath containing nickel and/or cobalt ions, the resultant powder from the first of the said stages serving as substrate for the second stage.

In the complementary stage the said bath contains nickel-II hydroxide/tri(ethylenediamine) and/or cobalt-II hydroxide/tri(ethylenediamine) and at least one stabiliser, the ethylenediamine acting as complexing agent and being progressively introduced as reducing agent.

In the deposition stage of the modifying element and if necessary in the complementary stage, the powder to be treated is suspended, while stirring, in the deposition bath.

The stirred suspension is contained in a receptacle whose wall that is in contact with the suspension is substantially spherical.

The object of the invention is also a metal alloy powder such as may be obtained by the process defined above, which includes a powder effectively obtained by this process as well as a powder obtained by a different route but having the same characteristics as the previous powder. In particular, such a powder contains nickel and/or cobalt, chromium, aluminium and yttrium in the form of a γ phase and a β phase dispersed in the γ phase, capable of forming from the β phase, by exposure to air at elevated temperature, an adherent superficial barrier of alumina, and contains moreover at least one modifying element capable of extending the existence domain of the said β phase and/or of increasing the fineness of its dispersion.

The invention also envisages the use of the aforementioned powder to form a coating based on the said alloy on a metal substrate.

The use according to the invention may comprise at least some of the following features:

The granules of the said powder are melted and the resultant droplets are projected by means of a plasma torch onto the substrate to form the coating.

The said coating is formed by electrophoresis in a medium containing the said powder in suspension and also containing an adhesion agent capable of permitting the agglomeration of the powder granules deposited on the substrate, following which a consolidation treatment of the coating is carried out.

The said consolidation treatment comprises the melting of the composite deposit present on the powder granules.

At least one film is formed by presintering the said powder by melting the composite deposit present on the powder granules, the said film is applied to the said substrate with the interpositioning of an adhesive layer, and a thermal treatment is carried out to effect diffusion between the coating and the substrate.

At least two films are formed by presintering powders having different compositions from one another, and the said films are superposed on one another and on the said substrate with the interpositioning of adhesive layers, to obtain after the said thermal diffusion treatment a coating having a composition gradient.

The said coating is formed by a vapour phase physical deposition technique from a source that is itself obtained by bonding granules of the said powder.

The coating is formed by evaporation in an electron beam.

The said source comprises, apart from the constituent alloy of the powder, a ceramic element joined to the metal element by a sealing cement comprising a middle layer of mullite connected to the ceramic element by a transition layer whose chemical composition changes progressively, with continuity of crystalline structure, from the composition of mullite to that of the ceramic element, and also joined to the metal element by an intermediate layer containing mullite, silica and an aluminide of nickel and/or cobalt, at concentrations that vary progressively between the middle layer and the metal element.

The coating is formed by cathodic sputtering.

The powder can be used, inter alia, to form on a turbine machine casing an impermeable coating that can be abraded by rotating turbine blades.

In the process according to the invention the modifying element is most often deposited on a powder of MCrAlY or of CrAlY(Ta), from a chemical deposition bath containing ions of this element. An AMDRY 997 powder or an AMDRY 995 powder may for example be used as starting material. Alternatively a powder free of Ni and Co may be used as starting material and one and/or other of the the said elements may be deposited in a complementary stage preceding or following the deposition stage of the modifying element, which enables a powder to be obtained whose composition is adapted to that of the alloy to be protected.

The sole enclosed FIGURE shows a device that can advantageously be used for the deposition stage or stages.

A suspension 9 of the powder to be treated in the deposition solution is placed in a spherical reaction vessel (flask with a neck), indicated by the reference numeral 10. Stirring is produced by a screw 11 that can rotate at high speed (up to 800 revolutions per minute). Heating is provided by a heating bath 12. The heat-transfer fluid used is water heated by the Joule effect at a temperature of 80° C., regulated by means of a contact thermometer 13 that controls a heating resistance 14. The heating bath is stirred by means of a magnetic stirrer 15. This system provides a homogeneous stirring vortex and an efficient stirring of the arrangement consisting of the bath and powders to be treated. Furthermore, the containment of the atmosphere above the bath restricts saturation of the latter with carbon dioxide.

This system is completed by a peristaltic pump 16 enabling the reducing agent to be supplied continuously, the concentration of the latter being substantially zero.

The deposition bath of the modifying element has a composition appropriate to the nature of this element.

For example, if a modifying element is chosen from platinum and palladium, a strongly basic bath may be employed containing ethylenediamine as complexing agent, at least one stabiliser, and hydrazine as reducing agent.

In the case of palladium, there may more particularly be used an aqueous autocatalytic chemical bath having a pH between 8.5 and 14, whose dissolved species, with the exception of the reducing agent, have the following composition in moles/litre:

| | |
|---|---|
| palladium ions | 0.01 to 0.3 |
| chloride ions | 0.01 to 0.5 |
| ethylenediamine | 1 to 4 |
| arsenic pentoxide | $10^{-4}$ to $10^{-2}$ |

| -continued | |
|---|---|
| or copper sulfate | $10^{-5}$ to $10^{-3}$ |
| or potassium iodate | $10^{-6}$ to $10^{-3}$ |
| imidazole | 0.2 to 0.6, | the amount of ethylenediamine being sufficient to complex all the palladium ions and to combine furthermore with the chloride ions, thereby avoiding the presence of free chloride ions in the vicinity of the particles to be coated.

Further details concerning the composition and use of these baths can be found in FR 2 652 822 A and FR 2 652 823 A, reference to which is given for the purposes of information.

Rhenium may be deposited from an $Re^{+II}$-oxalate complex.

In the possible complementary stage, there is advantageously used a bath containing nickel-II hydroxide/tri (ethylenediamine) and/or cobalt-II hydroxide/tri (ethylenediamine) and at least one stabiliser, the ethylenediamine acting as complexing agent, and in which hydrazine is added progressively as reducing agent. The said bath is an autocatalytic bath for depositing pure nickel and/or cobalt, as described in FR 2 590 595 A, reference to which is given here for the purposes of information.

The coated powder may be used for a plasma projection according to known techniques. If a complementary stage follows the deposition stage of the modifying element, it is convenient to carry out the projection in a controlled atmosphere so as to avoid oxidation of the deposited metals.

In addition to the preservation of the aluminoforming effect of the β-NiAl phase down to low aluminium concentrations, the invention leads to a double anchorage in the protective coating of the ceramic layer formed on the latter by high temperature oxidation, thanks to the simultaneous presence of yttrium and of the modifying element.

The powder coated in a single stage may also be used to effect a deposition by electrophoresis on the substrate to be coated. This deposit may then be consolidated, either by an aluminisation or by an electrolytic deposition followed by an annealing, or by the melting of a powder of appropriate composition.

The electrophoretic deposition is typically carried out in a medium containing ethyl alcohol and casein. After drying, the deposited powder adheres to the substrate since it is bonded in a manner known per se by the casein. This deposit is porous and does not provide any mechanical support. The deposit may be compacted by depositing aluminium in the vapour phase so as to obtain a modified NiCoCrAlYTa. The deposit may also be compacted by depositing on its surface pure nickel or pure cobalt or a nickel-cobalt alloy by reduction of a salt by using hydrazine, as described in the aforementioned patent FR 2 590 595 A, this deposit then being followed by a high-temperature diffusion annealing (for example 8 hours at 1100° C.). In this case it is convenient to adapt, if necessary, the composition of the MCrAlY powder that is used.

The coating of the powder intended for the electrophoretic deposition may also be a composite coating obtained by suspending in the deposition solution, together with the powder to be coated, also particles that will be incorporated into the coating. The modifying element may then be contained in the particles, for example in the form of a silicide such as PdSi, and/or in the solution as described above. In the case where the modifying element is contained only in the particles, the deposition solution may contain nickel and/or cobalt ions, a compound of a flux element selected from boron and phosphorus being introduced progressively as reducing agent, in order to obtain a deposit whose matrix contains nickel and/or cobalt combined with the said flux element.

In the latter case the deposition solution advantageously contains in addition at least one complexing agent for the said nickel and/or cobalt ions and at least one water-soluble organic stabiliser that does not contain either sulfur or any metal or metalloid of Groups IIIa (except boron and aluminium), IVa (except carbon), Va (except nitrogen and phosphorus), VIa (except oxygen) and VIIa (except fluorine and chlorine), and that contains an electron pair that can easily be captured by nickel and/or cobalt. Such solutions are described in FR 2 531 103 A, reference to which is given for the purposes of information.

The electrophoretic deposit of the powder provided with a composite coating, produced as described hereinbefore, is porous and does not provide any mechanical support. The support may be subjected to annealing in a neutral or reducing atmosphere that will first of all ensure the fusion of the composite deposit with the surface of the granules of MCrAlY(Ta), thereby compacting the coating, and secondly will homogenise by diffusion the coating that is obtained. A coating of modified MCrAlY(Ta) is thus obtained, containing silicon that should promote the adherence of a thermal barrier. The use of a reducing atmosphere (for example hydrogen) is essential in the case where the granules of CoCrAlY powder are coated by a composite deposit of nickel/boron +silicide of a precious metal, since this will enable the boron to be removed after the brazing alloy has melted. This technique also enables the composition to be varied either continuously or by means of successive deposits, each deposit having its own specific chemical composition (pure metal, alloy or even dense or hollow ceramic powder). There is thus obtained either a coating having a composition gradient independent of the diffusion routes, or a multilayer system.

It should be noted that the proposed techniques enable each grain of powder to be coated, which distinguishes them from the possible addition of a modifying metal to the β phase by metallurgical processes (casting of an ingot of suitable composition, followed by sputtering).

According to another aspect of the invention, presintered powders of modified MCrAlY are used in the form of films in order to form a coating by brazing on a substrate.

A series of powders of different compositions, containing one or more fluxes (B, P, Si), is prepared as described above. The various powders are presintered into films, for example by heating for 5 minutes at the melting point of the composition having the lower melting point. The films obtained are superposed and bonded to one another by a transfer film. This type of bonding will serve to bond the assembly of films to the surface of the substrate to be coated. After a diffusion heat treatment (for example 5 hours under a controlled or reducing atmosphere at 1100° C.), an interdiffusion will have taken place between the various coating layers and the substrate. The choice of a reducing atmosphere enables the carbon residues due to the pyrolysis of the bonding films to be eliminated.

The presence of Si in the external layer improves the adherence of the possible layer of yttrified zirconium oxide. The borides necessary for producing the presintered films and/or adding elements promoting the high-temperature oxidation behaviour are eliminated at least in large part by diffusion into the substrate. A high degree of compositional flexibility is provided, enabling a β-(Ni,Pt)Al bonded to the substrate and surmounted by an MCrAlY modified by a metal of the platinum group to be obtained for example.

The superposed films may be replaced by a single film formed from a single powder.

The powder according to the invention may also be used to prepare a solid compact source serving to form the coating by means of a vapour phase physical deposition technique, for example by evaporation in an electron beam or by cathodic sputtering.

In particular, a modified MCrAlYTa test piece intended to be evaporated in an electron beam may be fabricated by melting the powder. This metal test piece may furthermore be bonded to a ceramic element by using a sealing cement comprising a middle layer of mullite joined to the ceramic element by a transition layer whose chemical composition changes progressively, with continuity of crystalline structure, from that of mullite to that of the ceramic element, and to the metallic element by an intermediate layer containing mullite, silica and an aluminide of nickel and/or cobalt, in concentrations that vary progressively between the middle layer and the metallic element. Such a composite arrangement and its method of preparation are described in FR 2 720 392 A, reference to which is given for the purposes of information.

The technique of evaporation in an electron beam enables thermal barrier sublayers to be fabricated.

A film or a tube may be fabricated in a similar manner to the test piece described above and may serve as a target for deposits by diode or triode cathodic sputtering (DCS, TCS or magnetron sputtering).

As has been seen, some techniques enable porous coatings requiring a consolidation treatment to be obtained from powders according to the invention. Depending on the degree of consolidation, an abradable coating may then be obtained, serving in particular as an impermeable coating for a turbine machine casing and whose thickness will be adjusted depending on the friction of the rotating turbine blades.

What is claimed is:

1. A process for the production of a metal alloy powder containing nickel and/or cobalt, chromium, aluminium and yttrium in the form of a γ phase and β phase dispersed in the γ phase, capable of forming from the β phase, by exposure to air at elevated temperature, an adherent superficial barrier of alumina, wherein the process comprises the step of forming, on a precursor alloy powder containing at least the elements Cr, Al and Y by using a chemical or electrolytic deposition bath, a deposit containing at least one modifying element capable of extending the existence domain of the β phase and/or increasing the fineness of its dispersion, wherein the modifying element is deposited, at least in part, in the form of particles of the element or of a compound of the latter suspended in a deposition solution, the particles being incorporated in a matrix deposited from ions contained in the solution.

2. A process according to claim 1, wherein the modifying element is selected from platinum, palladium, ruthenium, rhodium, osmium, iridium, iron, manganese and rhenium.

3. A process according to one of claims 1 and 2, wherein the bath is an autocatalytic chemical bath containing oxalate ions, ions of the modifying element, and a complexing agent for the latter.

4. A process according to claim 3, wherein the modifying element is selected from platinum and palladium, the complexing agent is ethylenediamine, and the bath is highly basic and contains in addition at least one stabiliser, hydrazine being introduced progressively as reducing agent.

5. A process according to claim 4, wherein the bath is an aqueous autocatalytic chemical bath having a pH between 8.5 and 14, whose dissolved species have the following initial composition in moles/litre:

| | |
|---|---|
| palladium ions | 0.01 to 0.3 |
| chloride ions | 0.01 to 0.5 |
| ethylenediamine | 1 to 4 |
| arsenic pentoxide | $10^{-4}$ to $10^{-2}$ |
| or copper sulfate | $10^{-5}$ to $10^{-3}$ |
| or potassium iodate | $10^{-6}$ to $10^{-3}$ |
| imidazole | 0.2 to 0.6, | the amount of ethylenediamine being sufficient to complex all the palladium ions and furthermore to combine with chloride ions, thereby preventing the presence of free chloride ions in the vicinity of the particles to be coated.

6. A process according to claim 1, wherein the compound is a silicide.

7. A process according to claim 6, wherein the deposition solution contains nickel and/or cobalt ions, a compound of a flux element selected from boron and phosphorus that is introduced progressively as reducing agent, and the matrix contains nickel and/or cobalt combined with the flux element.

8. A process according to claim 7, wherein the deposition solution contains in addition at least one complexing agent for the nickel and/or cobalt ions and at least one water-soluble organic stabiliser that does not contain either sulfur or any metal or metalloid of Groups IIIa (except boron and aluminium), IVa (except carbon), Va (except nitrogen and phosphorus), VIa (except oxygen) and VIIa (except fluorine and chlorine), and that contains an electron pair that can easily be captured by nickel and/or cobalt.

9. A process according to claim 1, wherein the deposition stage of the modifying element is preceded or followed by a complementary stage consisting of depositing nickel and/or cobalt on a powder containing at least the elements Cr, Al and Y, from an autocatalytic deposition bath containing nickel and/or cobalt ions, the resultant powder from the first of the stages serving as substrate for the second stage.

10. A process according to claim 9, wherein in the complementary stage the bath contains nickel-II hydroxide/tri(ethylenediamine) and/or cobalt-II hydroxide/tri (ethylenediamine) and at least one stabiliser, the ethylenediamine acting as complexing agent and the hydrazine being progressively introduced as reducing agent.

11. A process according to claim 1, wherein in the deposition stage of the modifying element and, where necessary, in the complementary stage, the powder to be treated is suspended, while stirring, in the deposition bath.

12. A process according to claim 11, wherein the stirred suspension is contained in a vessel having a wall in contact with the suspension that is substantially spherical.

13. A metal alloy powder obtained by the process according to claim 1, containing nickel and/or cobalt, chromium, aluminium and yttrium in the form of a γ phase and a β phase dispersed in the γ phase, capable of forming from the β phase, by exposure to air at elevated temperature, an adherent superficial alumina barrier, and containing in addition at least one modifying element capable of extending the existence domain of the β phase and/or of increasing the fineness of its dispersion.

14. A method for forming a coating on a metal substrate comprising applying a coating comprising a powder according to claim 13 onto the metal substrate.

15. A method according to claim 14, wherein the granules of the powder are melted and that the resulting droplets are projected by means of a plasma torch onto the substrate in order to form the coating.

16. A method according to claim 14, wherein the coating is formed by electrophoresis in a medium containing the powder in suspension and containing an adhesion agent capable of permitting the agglomeration of the powder granules deposited on the substrate, after which a consolidation treatment of the coating is carried out.

17. A method according to claim 16, wherein the consolidation treatment comprises melting a composite deposit present on the powder granules and including particles of the modifying element or of a compound of the latter, incorporated in a matrix containing nickel and/or cobalt combined with a flux element selected from boron and phosphorus.

18. A method according to claim 14, wherein at least one film is formed by presintering the powder, by melting a composite deposit present on the powder granules and including particles of the modifying element or of a compound of the latter, incorporated in a matrix containing nickel and/or cobalt combined with a flux element selected from boron and phosphorus, the film is applied to the substrate with the interpositioning of an adhesive layer, and a thermal treatment is then carried out to effect diffusion between the coating and the substrate.

19. A method according to claim 18, wherein at least two films are formed by presintering powders having different compositions from one another, following which the films are superposed on one another and on the substrate with interpositioning of the adhesive layers in order to obtain, after the thermal diffusion treatment, a coating having a composition gradient.

20. A method according to claim 18, wherein the coating is formed by a vapour phase physical deposition technique from a source that is obtained by bonding of the granules of the powder.

21. A method according to claim 20, wherein the coating is formed by evaporation in an electron beam.

22. A method according to claim 21, wherein the source comprises, in addition to the constituent alloy of the powder, a ceramic element joined to the metallic element by a sealing cement comprising a middle layer of mullite connected to the ceramic element by a transition layer whose chemical composition changes progressively, with continuity of crystalline structure, from the composition of mullite to that of the ceramic element, and to the metallic element by an intermediate layer containing mullite, silica and an aluminide of nickel and/or of cobalt, at concentrations that vary progressively between the middle layer and the metallic element.

23. A method according to claim 20, wherein the coating is formed by cathodic sputtering.

24. A method according to claim 14 wherein the metal substrate is a turbine machine housing and the coating is an impermeable coating that can be abraded by rotating turbine blades.

* * * * *